W. SIEBER.
METER BOX AND METER CONNECTION.
APPLICATION FILED JULY 28, 1911.
1,057,289.
Patented Mar. 25, 1913.
2 SHEETS—SHEET 1.
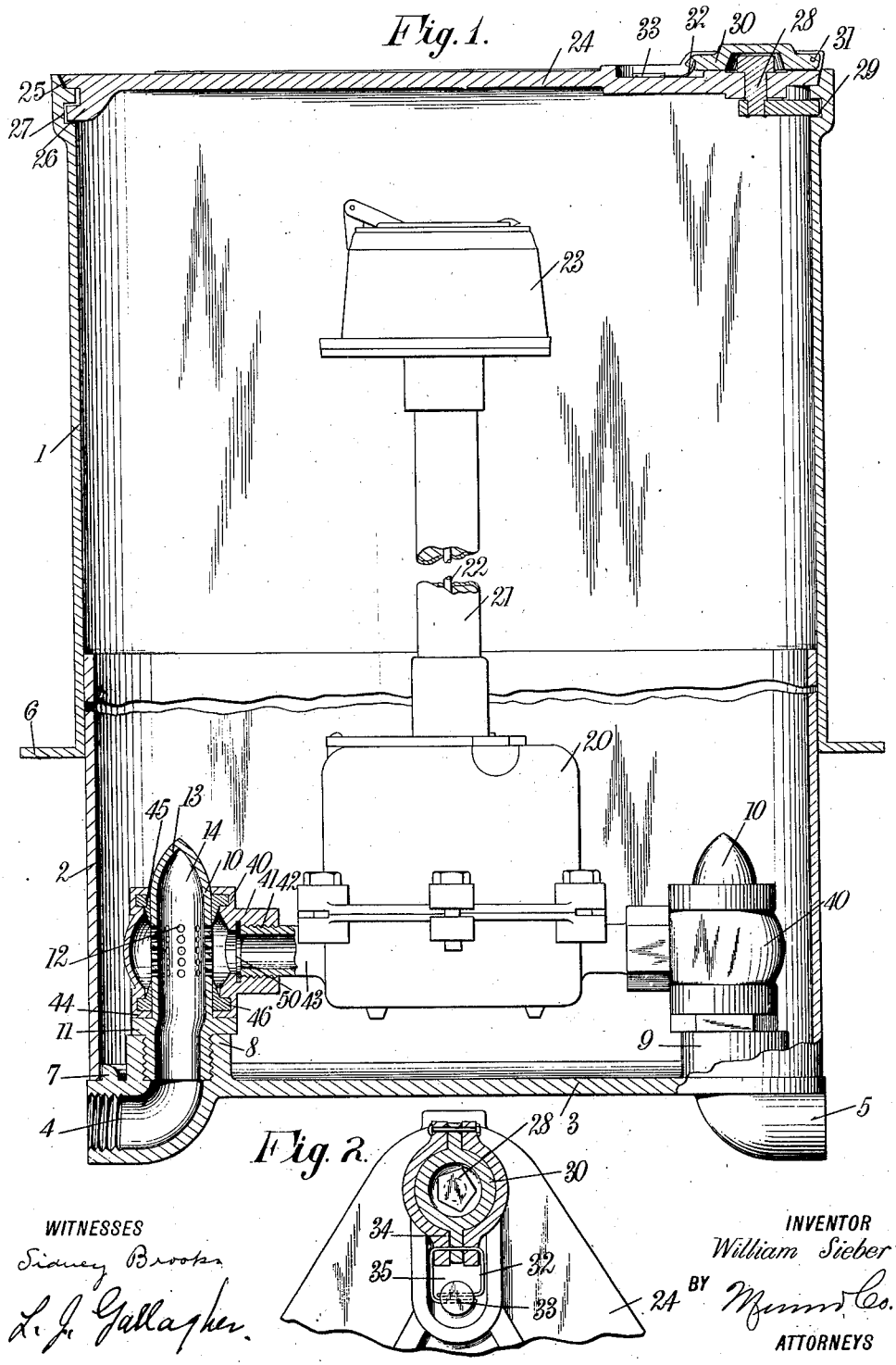
WITNESSES
Sidney Brooks
L. J. Gallagher
INVENTOR
William Sieber
BY Munn & Co.
ATTORNEYS

W. SIEBER.
METER BOX AND METER CONNECTION.
APPLICATION FILED JULY 28, 1911.

1,057,289.

Patented Mar. 25, 1913.

2 SHEETS—SHEET 2.

WITNESSES
Sidney Brooks
L. J. Gallagher

INVENTOR
William Sieber
BY Munn & Co.
ATTORNEYS

UNITED STATES PATENT OFFICE.

WILLIAM SIEBER, OF HENDERSON, KENTUCKY, ASSIGNOR OF ONE-HALF TO CASEY A. HART, OF HENDERSON, KENTUCKY.

METER-BOX AND METER CONNECTION.

1,057,289.   Specification of Letters Patent.   Patented Mar. 25, 1913.

Application filed July 28, 1911. Serial No. 641,061.

*To all whom it may concern:*

Be it known that I, WILLIAM SIEBER, a citizen of the United States, and a resident of Henderson, in the county of Henderson and State of Kentucky, have invented a new and Improved Meter-Box and Meter Connection, of which the following is a full, clear, and exact description.

My invention relates to a new and improved connecting means for use in a meter box adapted to contain metering devices, whereby the meter may be easily placed in and removed from service.

The object of my invention is to provide a new and improved connecting means for use in a meter box adapted to contain any of the standard meters for water or gas, the construction being such that it is only necessary to have the box large enough to admit the meter since the connection set forth which engages the meter requires no extended labor or time in placing the meter in service or in removing it therefrom.

A further object of my invention is to provide a new and useful meter connection which is especially adapted to connect meters in service, the construction of the parts being such that the meter may be put into or taken out of service in a short space of time, thereby doing away with the necessity of shutting off the supply while removing the meter and replacing it with another meter; the connections may be readily by-passed by screwing the tees to a piece of pipe the same length as the meter.

Reference is to be had to the accompanying drawings, forming a part of this specification, in which similar characters of reference denote corresponding parts in all the views, and in which—

Figure 3:
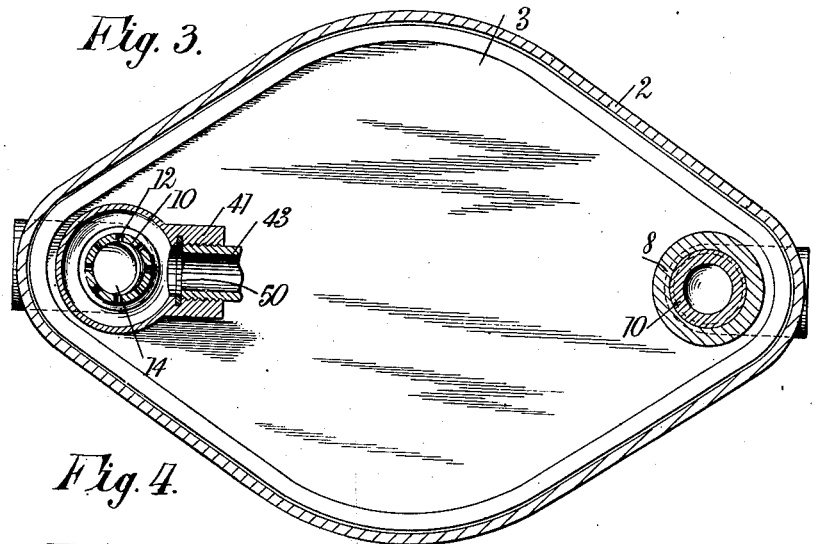
Figure 4:
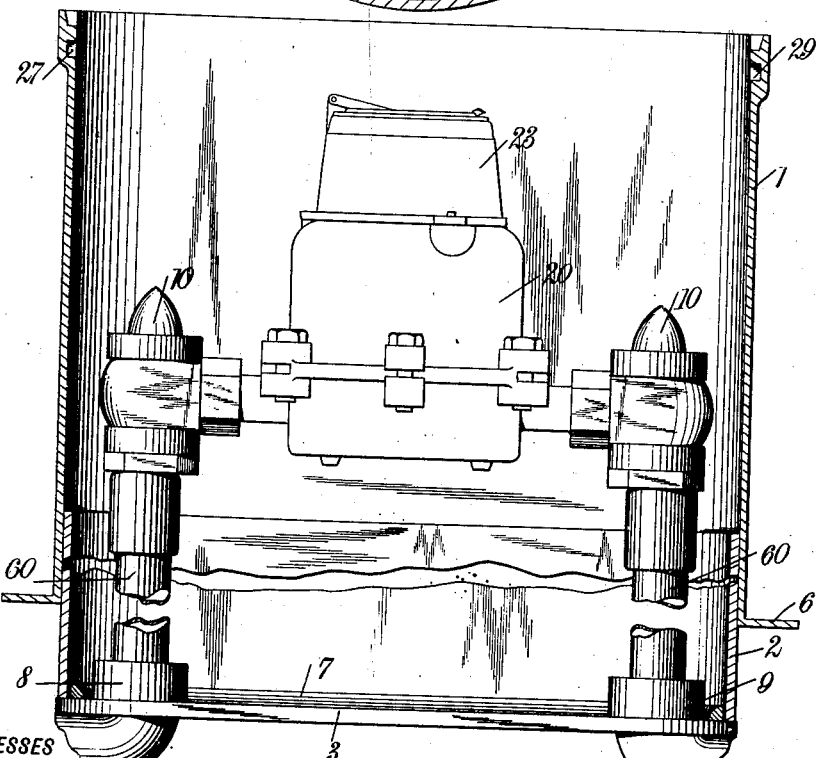

Figure 1 is a vertical sectional view showing the construction of the meter box, one of the meter connections being also sectionally shown; Fig. 2 is a partial plan view, partly in section, showing the method of sealing the cover in position; Fig. 3 is a plan view of the bottom of the box, the meter being removed; Fig. 4 is a vertical sectional view of the box showing the meter positioned therein, the meter connections being slightly varied in order to accommodate the meter.

The meter box is preferably made in sections, that shown in Figs. 1 and 4 compris-
ing two sections 1, 2, the shape of each being substantially as shown in Fig. 3, the lower section being provided with a bottom 3, interiorly threaded lugs 4, 5, being provided for connection with a water or gas main. The lower edge of the upper section 1 is provided on its outside with a peripheral flange or shoulder 6 adapted to rest against the earth or filling around the lower section, this shoulder providing a firm seat for the upper section and holding the same in position. The bottom 3 of the lower section 2 may be integral with the section itself or separate therefrom and, as shown in Fig. 1, the bottom is provided with a circular shoulder 7 slightly removed from its edge, the shoulder being adapted to rest against the inside of the lower section in order to position the same on the bottom.

The openings in the interiorly threaded lugs 4, 5, continue angularly up through the bottom 3 and terminate in interiorly threaded extensions 8, 9. Each of these threaded openings is adapted to receive the lower end of a perforated spud 10, having a hexagonal nut 11 thereon whereby it may be positioned within the opening, the spud being provided with a plurality of openings 12 intermediate its ends whereby it serves the function of a strainer. The upper end of each spud is tapered as at 13 for the purpose to be later set forth. It will be noted that the center of the top portion of each spud is eccentric to the center of the lower portion thereof, the result being that the opening 14 within it is offset so that the distance between the top portions of the spuds may be varied within certain limits by turning either or both of the spuds; such an arrangement provides a simple construction of parts in order to permit positioning of different size meters within the box thereby making allowance for small differences in the sizes of such meter.

In Fig. 1 the meter 20 is provided with a vertical extension 21 having a spindle 22 therein in connection with the dial box 23, this arrangement being preferable. The meter is usually placed below the frost line and it is desired to read the meter at different times. By making the meter box in sections it is especially well adapted for such uses, the size of its section being such that the cover 24 of the box is adjacent the surface of the ground. The contour of the cover 24 is the same as the cross-section of the section 1, a seat being provided around the top of the section 1 within which the inclined edge portion 25 is adapted to be positioned, the cover being secured in the following manner. A hook 26 is provided on the lower surface of the cover at any convenient point thereon, the interior of the section being provided with a recess 27 into which this hook is adapted to engage, the cover being provided at a diametrically opposite point with a latch 28 rotatably mounted on the cover, the lower end of the latch being adapted to be engaged within a suitable recess 29 in the interior of the section 1. In order to prevent access to the latch in order to release the cover, I have provided a smaller cover 30 pivoted at 31 to the main cover 24, the free end of the smaller cover being provided with registering openings through which a suitable piece of wire 32 passes, the ends of the wire being held together by any suitable seal 33.

Referring particularly to Fig. 2 it will be noted that the smaller cover 30 is recessed on its under side in order to receive the upper end of the latch 28, the wire 32 passing through an opening within a boss 34 carried by the top of the cover 24 whereby, when the wire is sealed, the cover 30 cannot be raised. The seal 33 is protected from injury in the case of traffic by providing a shallow recess 35 on the cover 24 which receives the seal. The connection between the perforated spuds and the meter is preferably as follows: A connecting T 40 has an opening extending through one of the arms thereof adapted to receive the spud 10, the other arm 41 of this T communicating with the said opening and having a threaded interior 42 adapted to be engaged with the threaded lug 43 on the side of the meter. The bottom of the arm of the T through which the spud extends forms a seat 44 which is adapted to rest on top of the hexagonal nut 11 carried by the spud, the water or gas-tight connection between the spud and the T being maintained by means of feather-edged washers 45 having peripheral flanges 46 thereon seated in the interior of the T. A suitable leather gasket 50 is positioned between the outer end of the threaded lug 43 on the meter and the interior of the T in order to maintain these parts against leakage. It will be noted that the interior of the vertical arm of the connecting T 40 is hollowed out or is of open construction, such a feature providing for outflow of water or gas from all of the openings 12 within the spud 10. The lower section of the meter box is positioned within an opening in the ground at any desired depth and the mains are connected to the threaded openings 4, 5. The upper section 1 is then positioned on top of the lower section, or, in fact, any desired number of sections may be positioned one above the other, the peripheral flange 6 on the upper section resting against the ground or earth which has been filled in around the lower section, thereby providing a firm seat for this upper section. The meter is positioned within the box by lowering it vertically and allowing the upper tapered ends of the perforated spuds 10 to enter into the vertical openings in the connecting T's 40, the tapered ends of the spuds not only serving to guide the T's but also greatly spreading the feathered washers 45 so that when the meter finally comes to rest the lower portions of the T's will be resting on the spuds and the parts will be held in position. It may be that the distance between the centers of the openings in each of the vertical arms of the T's 40 varies in different meters, and in such cases the spuds may be properly positioned by turning them slight distances since such movement varies the distance between them by reason of their eccentric construction, after which the particular meter used may be placed in position.

It is not necessary that the meter be positioned at the bottom of the lower section 2 of the meter box, in fact, the meter may be placed at any desired height therein and in Fig. 4 I have shown a modified construction wherein the extension and spindle 22 leading to the index box 23 are dispensed with, the meter being raised by means of pipes 60 having their lower ends in engagement with threaded lugs 8, 9, in the interior of the box, the perforated spuds 10 in this case being positioned at the upper ends of these pipes. Either construction may be adopted at will, whichever is better adapted to the circumstances, the inventive idea residing in either arrangement and each being comprehended in the spirit and scope of the appended claims.

Having thus described my invention, I claim as new, and desire to secure by Letters Patent:—

1. A connecting means for a meter comprising a perforated spud having an opening therein, the upper end of the spud being tapered and closed, with a connecting T having an opening extending therethrough, the said T being positioned on the said spud, the closed end of the spud projecting beyond the upper end of the T, together with washers within the T and in engagement with the spud to prevent leakage.

2. A connecting means for a meter comprising a spud having one end thereof closed, the central open portion of the spud communicating with a plurality of openings in the sides of the spud, together with a connecting T, one arm of which has an opening extending therethrough into which the said spud passes, there being packing means within the T and engaging the spud in the outside thereof in order to prevent leakage.

3. A connecting means for a meter comprising a member having one end thereof tapering and closed, the member being provided with a plurality of openings communicating with the interior thereof, a T, one of the arms thereof having an opening extending entirely therethrough, the said member with the tapering end entering the said opening in the arm, together with packing material within the T at opposite ends thereof and positioned on opposite sides of the said openings in the said member whereby when the parts are brought together they are secured against leakage.

4. A connecting means for a meter comprising a spud having a threaded end, the other end of the spud being tapered and closed, the spud being provided with a plurality of openings between the said ends and communicating with the interior thereof, a connecting T, one arm of which is adapted for connection to a meter, the other arm having an opening extending entirely therethrough, the intermediate portion of the said arm being of greater diameter than the diameter of the said spud, packing material contained within the T at opposite ends of said arm, whereby, when the said spud is positioned within the opening in the said arm of the T, the packing material will engage the spud to prevent leakage, and the openings in the spud will permit fluid to pass from the spud into the T.

5. The combination of a plurality of spuds, each having its upper end closed and tapered, the lower ends of the spuds being provided with threaded portions, the central axis of one threaded portion being displaced from the central axis of the tapered portion, turning of a spud about the central axis of the threaded portion varying the distance between the tapered ends of both spuds, whereby, when the T's of a meter are to be positioned on the spuds, the spuds may be adjusted in order to receive the T's.

6. A connecting means for a meter, comprising a perforated spud, the upper end thereof being closed, a connecting T having an opening extending therethrough, the side wall of the said T adjacent the perforations of the spud being spaced therefrom, the T being positioned on the spud, together with washers within the T and engaging the spud to prevent leakage.

In testimony whereof I have signed my name to this specification in the presence of two subscribing witnesses.

WILLIAM SIEBER.

Witnesses:
B. S. MORRIS,
THOS. S. POSEY.